US012151236B2

(12) United States Patent
Owens

(10) Patent No.: US 12,151,236 B2
(45) Date of Patent: Nov. 26, 2024

(54) CONSTRUCTION OF A FABRIC BASED MICROFLUIDIC POINT OF CARE AT HOME DIAGNOSTIC SYSTEM

(71) Applicant: Tracie Owens, Dublin, CA (US)

(72) Inventor: Tracie Owens, Dublin, CA (US)

( * ) Notice: Subject to any disclaimer, the term of this patent is extended or adjusted under 35 U.S.C. 154(b) by 879 days.

(21) Appl. No.: 17/134,388

(22) Filed: Dec. 26, 2020

(65) Prior Publication Data

US 2022/0203362 A1 Jun. 30, 2022

(51) Int. Cl.
*B01L 3/00* (2006.01)

(52) U.S. Cl.
CPC ..... *B01L 3/502715* (2013.01); *B01L 2200/12* (2013.01); *B01L 2200/16* (2013.01); *B01L 2300/12* (2013.01); *B01L 2300/161* (2013.01)

(58) Field of Classification Search
CPC ........... B01L 3/502715; B01L 2200/10; B01L 2200/16; B01L 2300/12; B01L 2300/161
See application file for complete search history.

(56) References Cited

U.S. PATENT DOCUMENTS

2013/0095506 A1* 4/2013 Bhandari ............ B01L 3/50273 435/7.92
2015/0241379 A1* 8/2015 Choudhary ........ G01N 27/3275 204/403.04

OTHER PUBLICATIONS

Xu, Li, Thread as a versatile material for low cost ,microfluidic diagnostics, Dec. 9, 2009, ACS Applied Materials and Interfaces 2010, vol. 2, pp. 1, 1-6, retrieved from: https://pubs.acs.org/doi/full/10.1021/am9006148 (Year: 2009).*

* cited by examiner

*Primary Examiner* — Jill A Warden
*Assistant Examiner* — Alex Ramirez
(74) *Attorney, Agent, or Firm* — Richard Bennett Salles

(57) ABSTRACT

A fabric based microfluidic point of care at home diagnostic system is disclosed. The system comprising a fabric substrate one or more hydrophobic threads bound with one r more hydrophilic threads by means of weaving, knitting, embroidering, or sewing. The fabric is configured to define a flow path for a sample to flow from an introduction zone, to a preparation zone, to a testing zone, in a pattern sufficient to optimize the sample analysis required for sample diagnostic tests. The system further comprises one or more mechanical stages and one or more fluid cartridges. The mechanical stages comprise electrical and/or analytical equipment configured to record, detect, analytes or facilitate chemical reactions and/or condition of the air above the fabric to ensure sufficient for analysis. The fluid cartridges are attached to the edge of the fabric in certain zones to supply the fabric with reagents required for analysis in that zone.

8 Claims, 5 Drawing Sheets

500

CONSTRUCTION OF A FABRIC BASED MICROFLUIDIC POINT OF CARE AT HOME DIAGNOSTIC SYSTEM

TECHNICAL FIELD

The present disclosure relates generally to fabric based microfluidic devices, and more particularly, to an in-home amphiphilic device configured to capture and control the microfluidic flow of biological fluids such as blood, saliva, and urine, to identify disease or infection and analyze overall health of an individual.

BACKGROUND

In medical diagnostic test devices, biological fluids such as whole blood, plasma, serum, nasal secretions, sputum, saliva, urine, sweat, transdermal exudates, cerebrospinal fluids and the like may be analyzed in clinical laboratories for specific components and properties that are clinically important for monitoring and diagnosis. The clinical laboratory testing requires instruments and tests with high accuracy and precision. Costs for lab tests is also one of the major concern. Some clinical lab tests are conducted in high volume because of the large number of patients undergoing tests. There are drawbacks associated with such procedures that require sequential and additional steps and transfers of multiple reagents to produce the assay. Each additional step for a detection assay increases the degree of difficulty for execution and may even increase chances of contamination or error by the operator and is prone to misuse, thereby, resulting in a higher margin for error.

To overcome such problems, microfluidic devices are engineered to transport small volumes of fluids to precise locations on a substrate, where (bio)chemical reactions can then be carried out. This is particularly beneficial to the medical field for rapid analysis of patient biofluids for disease or drug screens, and in fundamental biological and chemical studies. Several different kinds of microfluidic devices can be engineered and are known to the art. Most microfluidic devices are made by soft lithography methods to create complex 2D and 3D channel structures with polydimethylsiloxane (PDMS) elastomer; the polymer mold is typically bonded to a glass or silicon substrate for mechanical support. Recently, researchers have started to employ other means of fabricating microfluidic devices, such as, 3D printing and textile manufacturing, in order to provide a path to commercial manufacturing.

Development of a microfluidic based diagnostic system applicable to consumer markets, can address public health concerns exacerbated by expense and/or lack of the availability of frequent medical diagnostic testing. However, it is desirable to have a clinical diagnostic instrument that can reduce the undesirable processing steps of transferring samples to labs and instead complete a diagnostic test in a physician's office or at a patient's bedside.

In light of all the above mentioned drawbacks, there is a need for an improvement with an in-home care device, which eliminates the need to send samples to the lab, by enabling individuals to frequently conduct clinical tests themselves. Also, there is a need for a microfluidic based diagnostic system applicable to consumer markets, which can address public health concerns exacerbated by expense and/or lack of the availability of frequent medical diagnostic testing. Further, there is a need for amphiphilic fabrics that are highly scalable and affordable microcontactors for liquid-liquid extractions.

SUMMARY

According to the present invention, a microfluidic point of care at home diagnostic system device is configured complete multiple clinical tests on bodily fluid such as blood, saliva and urine samples to track a person's overall health, and identify disease or infection. In one embodiment, the system comprises a fabric substrate made of one or more threads which have hydrophobic nature and one or more threads which have hydrophilic nature. In one embodiment, the threads may be bound together by means of weaving, knitting, embroidering or sewing in order to define a flow path for a sample to flow from an introduction zone, to a preparation zone, to a testing zone, in a pattern sufficient to optimize the sample analysis required for blood, urea or saliva diagnostic tests or analysis.

In one embodiment, the at least one hydrophobic thread is made of fibers selected from a group consisting of polyester, polypropylene, cotton, silk, nylon, viscose or combinations thereof. In one embodiment, the fabric is made from fibers having a diameter ranges from about 5 to 100 micron, thread of diameter ranges from 50 to 600 micron and, constructed to obtain fabric void fractions between 30% to 95%. In one embodiment, the fabric is constructed by means of weaving, knitting, embroidery, sewing and/or have non-woven components to impregnant reagents. In one embodiment, the fibers are treated with various surface treatments, surface treatments including, but not limited to, hydrophobicity, hydrophilicity, or analyte selective surface chemistries. In one embodiment, the fabric is constructed to carry out various clinical tests and techniques including, but not limited to, polymerase chain reaction, basic metabolic panel and or electrolytic analysis, cell counting, urinalysis, blood analysis, salivary analysis, extraction, separation, or immunoturbidimetry. In one embodiment, the fabric is embedded or the fibers coated with electrical components.

In one embodiment, the system further comprises one or more mechanical stages which may be used with the fabric. In one embodiment, the mechanical stages contain electrical and/or analytical equipment or devices to record, detect analytes or facilitate chemical reactions and/or condition the air above the fabric to ensure sufficient for analysis. In one embodiment, the mechanical stages are movable and lock in place with fluid cartridges. The analysis of bodily fluid is used for diagnosis of medical conditions. In one embodiment, the sample of bodily fluid is selected from the group consisting of blood, urine, or saliva. In one embodiment, the sample of bodily fluid is obtained from intravenous, prick, microneedle, swap, mucus, spit or cup or a combination thereof. In one embodiment, the bodily fluid sample is between 10 microliter to 10 milliliter in volume.

In one embodiment, the system further comprises one or more fluid cartridges or reservoirs, that may be used with the fabric and mechanical stages. In one embodiment, the fluid cartridges are designed to attach to the edge of the fabric in certain zones to supply the fabric with reagents required for analysis in that zone, and which are shaped to connect with the mechanical stages, such that, the two form an enclosure immediately above the fabric. In one embodiment, the fabric devices are up to 2 ft by 2 ft in size and the enclosure is up to 4 ft by 4 ft.

In one embodiment, the fabric and embedded instrumentation are contained within an enclosure that protects the electrical equipment and facilitates the storage or movement or attachment of the instrumentation to the fabric for 1, 2, 3 or more movable mechanical stages with embedded instrumentation, the attachment, storage or movement of a sample containing cartridge, and/or the attachment, storage or movement of a reagent containing cartridge, and a static or movable stand to hold the fabric device. In one embodiment, the rate and direction of fluid flow within the fabric are controlled by surface chemistry and placement o fibers. In one embodiment, the reagent and sample reservoirs come into contact with the fabric using various means, including but not limited to, reservoir, reservoir with attachment, cartridge, or cartridge with attachment.

In on embodiment, a method of identifying disease or infection from bodily fluid for diagnosis of medical conditions using a microfluidic point of care at home diagnostic system, the method comprising the steps of: at n step, a sample of bodily fluid is obtained. At another step, the bodily fluid is transported within a contacting fabric containing surface treated fibers to control the rate of sample flow and dispersion of the sample to reaction, separation or dilution sites. At another step, the progress of the reaction, separation or dilution are recorded through use of various instrumental techniques including, but not limited to, sensor(s), heating element(s), electrodes (e.g. ISE, basic), electrical signal detectors, colorimeter or UV-vis spectrometer, microprocessor, analog or digital display. In one embodiment, the instrumental techniques are embedded in movable mechanical stages positioned over the fabric. At another step, the results of analysis are saved and the history is reported as analytical results.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

Figure 1:
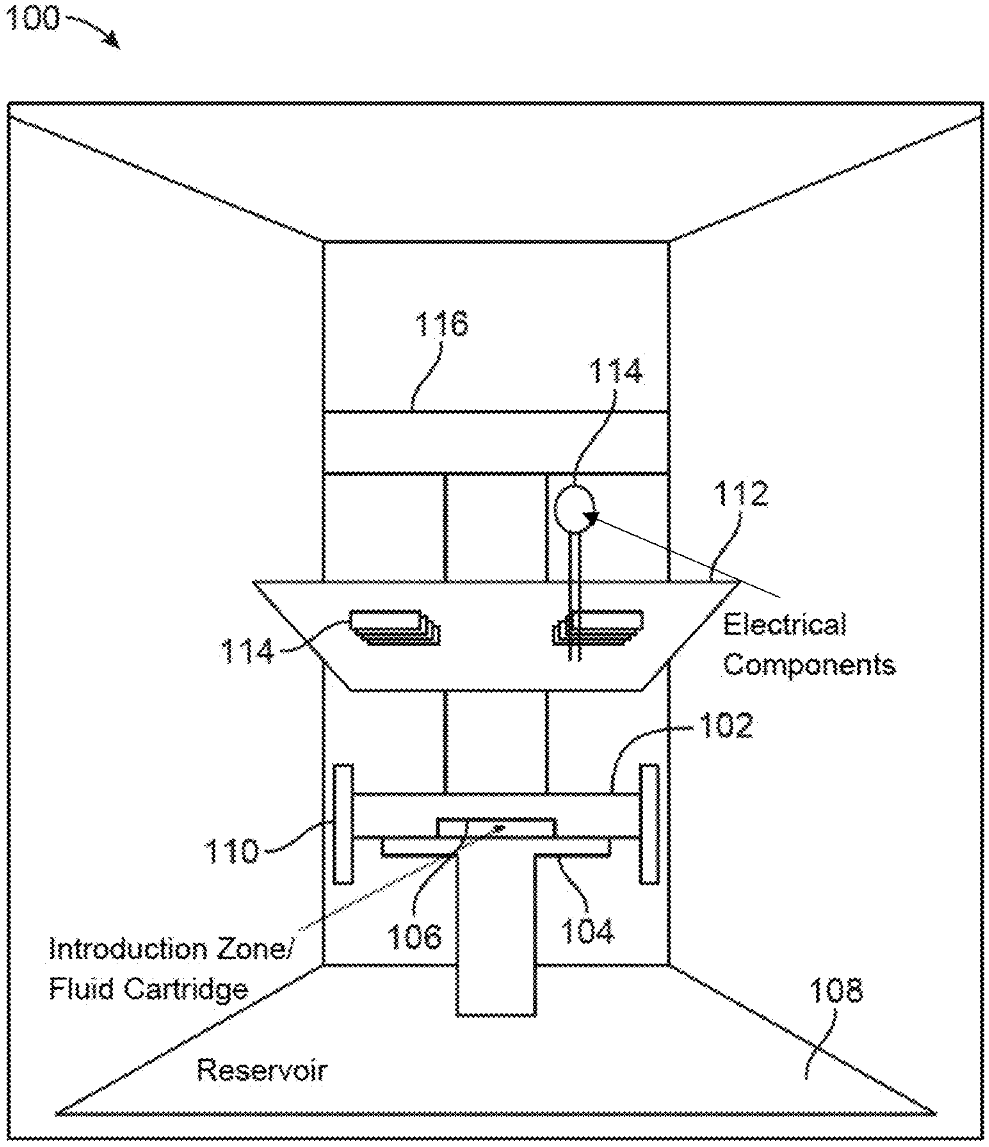
FIG. 1 exemplarily illustrates a schematic representation of a fabric based microfluidic point of care at home diagnostic system, according to an embodiment of the present invention.

The definitions provided herein are to facilitate understanding of certain terms used frequently herein and are not meant to limit the scope of the present disclosure.

As used in this specification and the appended claims, the singular forms of "a", "an", "the" encompass embodiments having plural referents, unless the content clearly dictates otherwise.

Unless otherwise indicated all numbers expressing feature sizes, amounts, and physical properties used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims the term "or" generally employed in its sense including "and/or" unless the content clearly dictates otherwise.

Thread as used herein refers to a single element (as a yarn or strand), which can be a part of a woven, knitted, embroidered, sewn or plaited material.

Analyte, as used herein, refers to a substrate or chemical constituent that is determined in an analytical procedure. For instance, in a urinalyses the analyte can be a protein, glucose, ketones, haemoglobin, bilirubin, urobilinogen, acetone, or leucocyte which react with reagents to detect for diabetes, liver, kidney problems or urinary tract infections. For example, the analyte indolecarboxylic acid can combine with a diazonium salt to produce a violet color to indicate the presence of white blood cells in urine, often present for urinary tract infections. In blood glucose testing the analyte is glucose. In another instance, the analyte could be electrolytes or creatine in blood detected to carry out a basic metabolic panel, or the analyte could be white and red blood cells which are detected to determine complete blood count. In another instance, the analyte could be DNA or nucleic acid in saliva, which if detected after completing polymerase chain reaction to amplify specific regions of DNA could indicate virus or bacteria. In another exemplary instance, analyte may include a drug to be detected such as cocaine from a blood analysis. The analytical procedure may include, for instance, fluorescence, mass-spectroscopy, video microscopy, colorimetry, radio-imaging, UV vis spectroscopy, electro chemical detection, electrical sensing and the like, and combinations thereof. In some instances, analytes may be referred to as antibodies. In other instances, analytes may be referred to as antigens. In some other instances, analytes may include small molecule metabolites or cells. Exemplary small molecule metabolite that are tested for diagnostic, therapeutic or other purposes include, but not limited to blood gas, metal or other non-metallic ions, electrolytes, biopolymers and other components, cells like CD-4, CD-8 or CD-64 that are useful markers for viral or bacterial load and the like and combinations thereof.

Antibody as used herein refers to protein that is used in the identification of specific antigen. The specific antigen is typically a marker of a disease or certain type of diseases.

Sometime antibodies may be referred to as immunoglobins. Antibody may be a primary or secondary antibody. Primary antibodies are antibodies raised against a specific antigen and are generally unlabeled. Primary antibodies may also be referred to as capture antibodies. Secondary antibody is an antibody that binds to primary antibody or fragments contained within the primary or capture antibody. Secondary antibody comprise label that render them useful for detection. Typical labels include fluorescent moiety, radio-active compounds, enzyme-linked labels, magnetically active particles, nanoparticles, quantum dots, latex particles labels and the like and combinations thereof. Depending on the label the method used to detect, identify and quantitate may include fluorescence or microspectroscopy, radio-imaging, ELISA test, spectrophotometry and the like.

Antigen as used herein refers to a molecule that is recognized by an immune system of a living organism. Antigen also refers to molecular fragments that may be recognized by the immune system. It is generally known that a given antigen shows specificity to an antibody and this property of an antigen is used in a variety of applications.

Polyester as used herein refers to a synthetic fiber obtained by a chemical reaction called polymerization, in which the alcohol of a petroleum by product, ethylene, ethylene glycol and dimethyl terephthalate, a diester formed from terephthalic acid, a carboxylic acid, are mixed in the presence of a catalyst at a temperature to form monomer which is then combine with the terephthalic acid at raised temperature to form polyester. Polymerization conditions (pressure, temperature, reactant concentrations) may be set depending on the grade of polymer desired to be produced. The polyester thread most useful to the invention can be woven into textiles. The polyester is then extruded into fibers using a variety of methods of but not limited to melt, dry or wet spinning. The polyester thread can then be coated or modified with chemicals to give it hydrophilicity.

Polypropylene as used herein refers to a synthetic fiber obtained by a chemical reaction called polymerization which occurs for a petroleum by product, propylene gas when in the presence of a catalyst system, usually Ziegler-Natta or metallocene catalyst. Polymerization conditions (pressure, temperature, reactant concentrations) may be set depending on the grade of polymer desired to be produced. The polypropylene most useful to the invention can be woven into textiles. The polypropylene is then extruded using a variety of methods of but not limited to melt, dry or wet spinning to form a polypropylene thread.

Cotton as used herein refers to cellulosic fibers made from the genus *Gossypium*. The cotton most useful to the invention can be woven into textiles. It can be used as such, or may be modified to render some useful properties to the final thread. Techniques and chemicals for the modification of naturally occurring cotton to improve its properties are known in the art. One exemplary process includes mercerization of cotton. Another process involves preparation of cellulose xanthate.

Silk as used herein refers to a fiber obtain from silkworms, more specifically from the larvae of mulberry silkworms. The silk most useful in the invention can be woven into textiles, such as that obtained from silkworm *Bombyx Mori*, however, other forms of silk that may be synthetically made or produced from other sources may also be useful for the invention. The silk may be modified to suit the requirements of the invention. The modifications may include physical and chemical modifications. A particularly useful modification includes subjecting the silk fiber to a process of degumming. Methods and compositions of degumming are known in the art and can be suitably applied in the invention.

According to the present invention, a fabric based microfluidic point of care at home diagnostic system is an analyzer is designed to conduct multiple clinical tests on bodily fluids such as saliva, blood, and urine to track overall health, and identify disease or infection. In one embodiment, the system is an analytical equipment, analytical instrument, diagnostic analyzer, point of care, point of care analyzer, lab on a chip, microfluidic analyzer, fabric contactor, colorimeter, or spectrophotometer. In one embodiment, the system is configured to eliminate the need of sending samples to the lab by enabling individuals to frequently conduct clinical test themselves. The system comprises a fabric configured to transport fluids and completes analysis. The system further comprises an instrumentation embedded on movable mechanical stages configured to record analysis and processes clinical results. In one embodiment, the fabric and stages are interchangeable that enables saliva, blood, and urine testing in one device. In one embodiment, the results are saved and reported to user via smart phone applications.

In one embodiment, the present invention provides a diagnostic composition that comprises a fabric substrate made of one or more threads. In one embodiment, the threads include at least one hydrophobic thread and at least one hydrophilic thread. The at least one hydrophobic thread and hydrophilic thread are attached together by means of weaving, knitting, embroidery or sewing. In one embodiment the at least one hydrophobic thread of the fabric substrate could be made of polypropylene. In another embodiment, the at least one hydrophobic thread of the fabric substrate could be made of silk. In yet another embodiment, the at least one hydrophobic thread of the fabric substrate could be made of any other synthetic polymer with hydrophobicity, or a naturally occurring hydrophobic material. The hydrophobic thread could be coated or treated with either material to improve hydrophobicity, prevent size changes after contact with fluids or after stress, or to improve its properties in other ways. The selection of treatment and the method of applying the treatment depends on various factors such as the extent of hydrophobicity, flow characteristics, durability of the thread or substrate etc.

In one embodiment, the present invention provides a diagnostic composition that comprises at least one fabric substrate made of one or more threads. In one embodiment, the threads include at least one hydrophobic thread and at least one hydrophilic thread. The at least one hydrophobic thread and hydrophilic thread are attached together by means of weaving, knitting, embroidery or sewing. In one embodiment the at least one hydrophilic thread attached to the fabric substrate could be made of polyester coated with a chemical treatment to make it hydrophilic. The process of making hydrophilic thread is performed by chemically treating the material such that it contains polar or charged functional groups, rendering the material attractive to water. Such chemical treatments include graft polymerization, UV irradiation, plasma treatment, coating with surfactants, or mixing with a different kind of material with more hydrophilic nature. In another embodiment, the at least one hydrophilic thread attached to the fabric substrate could be made of cotton. In yet another embodiment, the at least one hydrophilic thread attached to the fabric substrate could be made of any other synthetic polymer with hydrophilicity, or a naturally occurring hydrophilic material. The hydrophilic thread could be coated or treated with either material to improve hydrophilicity, prevent size changes after contact with fluids or after stress, or to improve its properties in other ways. The selection of treatment and the method of applying the treatment depends on various factors such as the extent of hydrophilicity, flow characteristics, durability of the thread or fabric etc.

In one embodiment, the present invention provides a diagnostic comprising, a fabric substrate, composed of one or more threads which have hydrophobic nature and one or more threads which have hydrophilic nature. In one embodiment, the hydrophobic threads could be coated or treated with chemical to give them hydrophobicity. In one embodiment, the hydrophilic threads could be coated or treated with a chemical to give them hydrophilicity. In one embodiment, the hydrophilic threads could be attached to the substrate by a number of means including, but not limited to, weaving, knitting, embroidering, or sewing.

In one embodiment, the substrate or the threads may have electrical components attached to them. In one embodiment, the substrate or the threads may be coated with conducting material or treated to contain diagnostic material. In one embodiment, the substrate or the threads may be impregnated with analyte or solvent material to facilitate detection of chemicals, chemical reactions and/or diagnoses.

In one embodiment, the conducting materials include, but not limited to, carbon ink, silver halide, gold, platinum, conducting polymers such as polyaniline, and the like and combinations thereof. When the conducting material comes in contact with a specific material or types of materials, it becomes electrically active and provides rise to electric signals. These electric signals are then capable of being detection using appropriate detection means.

In one embodiment, the diagnostic material could be any of the analytes. In one embodiment, the diagnostic material could be any reagent specific to a given analyte that could be used to test the presence or absence of it, or alternatively, measure the amount of the analyte present. The analyte or the specific reagent for the analyte could be used to stimulate the conduction material or generate pigment upon contact giving rise to the electrical signals or colors, which are then measured to provide suitable output. In one embodiment, the diagnostic material is glucose oxidase. When it comes in contact with glucose, effects a redox reaction giving rise to an electron that leads to an electrical signal. The extent of the electrical signal may then be used to quantitate the amount of glucose present using a suitable predetermined calibration curve. In another embodiment, the diagnostic material is Indolecarboxylic acid ester. In the presence of certain leukocytes in white blood cells in urine, the diagnostic material catalyzes a reaction to produce Indoxyl which can combine with a diazonium salt reagent to produce a violet color. In one embodiment, the light intensity effected by the change in color can be detected with video microscopy or other colorimetric methods.

In one embodiment, the fabric substrate comprising at least one hydrophobic thread with at least one hydrophilic thread attached to it by means of weaving, knitting, embroidery, or sewing. In one embodiment, the fabric substrate further comprise suitable modifications to enable efficacy as a diagnostic composition. In an exemplary embodiment, at least one thread comprises a suitable antibody for specific antigen to detect the presence or absence of an analyte in the test sample. Such antibodies are linked to the thread via various methods, which may include chemical and physical modifications.

In one embodiment, the present invention provides a microfluidic point of care fabric device having a sample introduction zone, a sample preparation zone, and sample testing zone. In one embodiment, the microfluidic point of care fabric device is made of a hydrophobic substrate. The hydrophobic substrate has one or more hydrophilic threads woven, knitted, embroidered or sewn into it to define a flow path for the sample to flow from the introduction zone to the preparation zone, to the testing zone. In one embodiment, at least one hydrophilic thread or one part of the hydrophobic substrate has electrical components attached to it, may be coated with conducting material or treated to contain diagnostic material, may be impregnated with analyte or solvent material to facilitate detection of chemicals, chemical reactions and/or diagnoses. In one embodiment, the at least one thread of the hydrophobic substrate is made of polypropylene. In one embodiment, the at least one thread of the hydrophilic material is made of polyester coated with any hydrophilic surface treatment. The hydrophilic thread could also be cotton, or any other naturally occurring hydrophilic material coated or treated with material to prevent size changes after contact with fluids or after stress, or to improve its properties in other ways. The hydrophobic thread could also be silk, or any other naturally occurring hydrophobic material coated or treated with material to prevent size changes after contact with fluids or after stress, or to improve its properties in other ways.

In one embodiment, the present invention provides a microfluidic point of care fabric device system. In one embodiment, the microfluidic point of care fabric device system comprises one or more microfluidic point of care fabrics that have been designed with several different variations of weaving, knitting, embroidery or sewing of the hydrophilic threads into the hydrophobic substrate. In one embodiment, the hydrophilic threads are attached into the hydrophobic substrate configured to control the flow path and rate of flow to various zones such as the sample introduction zone, preparation zone, and the testing zone, to optimize the diagnosis or chemical reactions required for sample of bodily fluid analysis. In one embodiment, the sample of bodily fluid is selected from the group consisting of blood, urine, or saliva.

In one embodiment, the present invention provides a microfluidic point of care fabric at home diagnostic system. In one embodiment, the microfluidic point of care fabric at home diagnostic system comprising microfluidic point of care fabric devices that have been designed with several different variations of weaving, knitting, embroidery or sewing of hydrophilic threads into a hydrophobic substrate specifically to control the flow path and rate of flow to the sample introduction zone, the preparation zone, and the testing zone, and to optimize the diagnosis or chemical reactions for blood, urea or saliva samples. In one embodiment, the microfluidic point of care fabric at home diagnostic system further comprises one or more mechanical stages. The mechanical stages contains electrical and/or analytical equipment or devices to record or detect analytes to facilitate chemical reactions and/or condition the air above the microfluidic point of care fabric devices during analysis. In one embodiment, the mechanical stages could be molded to have extruded zones, which enables the specific zone of the stage to make contact with a certain zone or zones of the fabric device to prevent sample evaporation or contamination during analysis. In one embodiment, the analytical equipment consisting of but not limited to contacting fabric(s), chemical reagent(s), reagent trays, reagent cartridges, sensor (s)/biosensor, heating element(s), electrodes (e.g. ion selective, basic), amplifier, preamplifier, data acquisition card, software and interface, automated mechanical stages and parts, electrical signal detectors, colorimeter or UVvis spectrometer, microprocessor, analog or digital display, power source, lens, and electrical components.

In one embodiment, the mechanical stages could work with fluid cartridges or reservoirs. In one embodiment, the fluid cartridges or reservoirs are designed to attach to the edge of the fabric in certain zones of the device to supply the fabric with reagents required for analysis in the corresponding zone, and which are shaped to connect with the mechanical stages, such that, the two form an enclosure above the fabric to prevent exposure of the electrical or analytical equipment contained in the mechanical stages to the fluid within the cartridge, reservoir or fabric, and may be used to condition the air above or around the microfluidic point of care fabrics to ensure accuracy and reliability of diagnostic results.

In one embodiment, the fluid cartridges may be made of any material suitable to withstand the conditions such as, pressure, temperature, chemistry, humidity, and time required to complete the diagnostic reactions and those that are compatibility with the reagents or sample expected to be contained within, such that the cartridge material does not degrade over a reasonable amount of time. Such suitable material includes metals or plastics, high temperature plastics, cardboard or combinations thereof. Such material may also be coated with chemicals to improve their properties and ensure they are effective for reagent storage and usage.

In one embodiment, the mechanical stages may be made of any material suitable to withstand the conditions such as pressure, temperature, chemistry, humidity, and time required to complete the diagnostic reactions. In one embodiment, the suitable materials include, but not limited to metals or plastics, high temperature plastics, wood or combinations thereof. The mechanical stage made of such suitable materials may be machined or molded to house electrical or analytical equipment. For example, a hole may be cut/machined/molded in the stage to house a lens and light sensor to record pigment or progression of fluid within the microfluidic device. Another hole may be cut/machined/molded into the device to house bio sensor(s), an electrode(s), a heating element(s), and/or a thermocouple(s), to detect the presence of certain analyte(s) and monitor the progression of analysis, it may also house such things as tubes to introduce or remove gases from the surface of the microfluidic device. For example, such machine or molding techniques include, but not limited to, welding, foam molding compression molding laminating, laser cutting and die cutting.

In one embodiment, the mechanical stage may also be machined or molded to create an air-tight seal with the fluid cartridges attached to the side of the microfluidic point of care device. Such molding would be shaped for use as a complimentary pair. For example, if the part of the fluid cartridge that makes contact with the edge of the stage was shaped to be a concave curve of a certain size, then the part of the mechanical stage making contact with that zone of the fluid cartridge should be shaped to have a convex curve fitting exactly to the concave curve of the stage. The stage may also be machined or molded to create a lid for certain regions of the fabric substrate in order to prevent sample loss due to evaporation or contamination during certain types of analysis. For example, in the case of completing thermal cycling during a polymerase chain reaction, the lid should be molded as to create several different connected chambers over a particular zone of the surface of the microfluidic fabric device once the stage is lowered over the fabric and an air tight seal is created with the fluid cartridges.

In one embodiment, the fabric designs useful for the invention may be those in which the hydrophilic threads create an optimized flow path that transports a precise amount of fluid sample to certain regions of the fabric to conduct many different kinds of diagnosis. For example, the diagnosis include, but not limited to, urinalysis, complete blood count, a basic metabolic panel, blood gas analysis, or techniques required for viral or bacterial detection such as ELISA, NAAT, polymerase chain reaction, or immunoturbidimetry.

In one embodiment, the microfluidic fabric designs are useful for urinalysis or electrolyte analysis to complete a basic metabolic panel. The metabolic panel may be those in which the hydrophilic threads are woven, knitted, embroidered or sewn onto the hydrophobic substrate to form several channels connected to a main flow channel. Each different channel would consist of a proximal end, nearest to the main flow channel, a distal path connecting the proximal end to the testing zone, and at least one testing zone where the sample may flow to make contact with reagents either impregnated in the fabric substrate in the testing zone or originating from a fluid cartridge connecting to the fabric substrate. If the reagent is originating from a fluid cartridge then there may be an additional flow channel after the testing zone extended from the testing zone to the end of the fabric where the fluid cartridge is attached. Several such channels may exist in the fabric to conduct different analysis, equally spaced apart as to prevent contamination of one analysis from the other. For example, in the case of urinalysis, the sample fluid may come into contact with the reagent sodium nitroprusside either impregnated in the testing zone of the device or wicking from a fluid cartridge attached to that particular testing zone of the fabric substrate. Once in contact with the sodium nitroprusside the sample fluid may turn pink in color to indicate the presence of ketones present for diabetic coma. In a second channel, the sample fluid may come into contact with a two reagents diazonium salt and indolecarboxylic acid ester, either impregnated in a second testing zone of the device or wicking from fluid cartridges attached to the fabric substrate. Once in contact with the diazonium salt, if there was leukocyte esterase present in the sample fluid the sample fluid may turn a violet color indicating the presence of certain white blood cells present for infections. The hydrophilic threads may be designed to create similar flow channels for urinalyses as for electrolyte analysis in blood. In this case, instead of coming into contact with a reagent in the testing zone, there may be an electrode present which becomes electrically active if specific ions are present in the sample fluid. In such cases, additional hydrophilic yarns connecting the testing zone to a reagent cartridge are not needed, instead, once the sample reaches the testing zone, it may come into contact with an ion-selective electrode. The electrode will then produce an electrical signal consistent with the presence of the specific electrolyte ion in the sample. In such cases, when required, the sample fluid may be mixed with reagents prior to the testing zone to liberate the ions of interest.

In one embodiment, microfluidic fabric designs useful for complete blood count or cell counting may be those in which the hydrophilic threads are woven, knitted, embroidered or sewn onto the hydrophobic substrate to form channels that can conduct flow cytometry, or cell counting. For example, there would be a main flow channel in which fluid can flow from the sample cartridge to an analysis zone consisting of two testing zones connected by one small channel. In one embodiment, additional flow paths could be created on the path to the analysis by the hydrophilic threads, where the sample could come into contact with reagents in order to prepare it for analysis. For example, for the preparation of whole blood to count select cells, such reagents may be necessary and include, red blood count lysis buffers. These may contain reagents such as formic acid, which disintegrate the cells to gain sufficient access to cell components, such as erythrocytes, containing the markers of interest for analysis of certain infections. Regions of the hydrophilic threads on the flow path to the analysis region may also be treated to immobilize or remove certain components in the blood which are not of interest to the analysis, such as, those cells or materials which do not contain markers indicating the presence of the infection of interest to the analysis.

In the analysis zone, there may be two testing zones connected by a single channel, a proximal testing zone closest to the sample cartridge and a terminal testing zone furthest away from the sample cartridge. In each testing zone there may be electrical conducting and sensing components. In the proximal testing zone, there may also be a component providing a specific amount of electrical resistance. This electrical resistance components may be connected to a power source which could supply an electrical signal to the proximal testing zone. A voltage probe may also be placed in the terminal testing zone. The electrical, conducting, sensing, and resistance components will be connected as to create an electrical circuit, starting in the proximal testing zone and ending in the terminal testing zone. In one embodiment, this electrical material may be embedded in the microfluidic device or embedded into a mechanical stage and inserted into the device once the mechanical stage is lowered over the fabric to create an air-tight seal with the fluid cartridges attached to the fabric. As a cell passes through the single channel connecting the proximal testing zone to the terminal testing zone of the device the electrical resistance signal of the testing zones which can be read by the voltage probe, will change. The number of changes in the signal can indicate the number of cells in the sample. If this analysis were to be complete for complete blood count instead of cell counting, the procedure would be the same, except the lysis buffer may not be needed.

In one embodiment, the microfluidic fabric designs useful for virus or bacteria detection may be those in which the hydrophilic threads are woven, embroidered or sewn onto the hydrophobic substrate to form channels that can conduct thermal cycling for polymerase chain reactions (PCR). In one embodiment, microfluidic fabric has be a main flow channel in which saliva fluid can flow from the sample cartridge to a PCR analysis zone consisting of at least thirty testing zones connected, in series, by one small channel each. At the end of the thirty channels there may be a terminal end. In each testing zone there may be electrical conducting and sensing components. The electrical material would heat the sample and/or measure and/or control the temperature of the sample. The electrical material may be embedded in the microfluidic fabric device or embedded into a mechanical stage and inserted into the device once the mechanical stage is lowered over the fabric to create an air-tight seal with the fluid cartridges attached to the fabric. The mechanical stage would be machined or molded to create a lid for each of the at least thirty testing zones. When in contact with the surface of the microfluidic device, the testing zones and the region of the mechanical stage forming a lid with the fabric, would create chambers for thermocycling of the sample fluid. This lid may be necessary to prevent sample loss due to evaporation, or contamination as heat is applied for specific durations of time during the reaction. At the terminal end of the PCR testing zone consisting of at least thirty testing zones connected in series by one small channel, there may be a biosensor either embedded within the microfluidic device or inserted into it once the mechanical stage is lowered over the fabric to create an air-tight seal with the fluid cartridges attached to the fabric. This biosensor will then produce an electrical signal consistent with the presence of a specific biological material in the output material from PCR, indicating the presence of infection, and/or the virus or bacteria of interest.

There may be a mechanical stage molded and designed to house the electrical equipment required for each different fabric design for urine, blood or saliva analysis. Thus, there may be at least three different mechanical stages housed within the microfluidic fabric device system. The mechanical stage may be attached to movable mechanical equipment such as but not limited to wheel and track, robotic arms or ribbons, that can be automated to raise, lower or shift the mechanical stage from a storage or use position within the system such that they are interchangeable, and the appropriate stage can be moved in place to be used with each different fabric design as required for each different analysis.

The microfluidic fabric device may contain at least one or several designs useful for urinalysis electrolyte analysis, complete blood count, cell counting, virus or bacterial detection, or to carry out other diagnostic analysis or protocols or combinations there of in which the hydrophilic threads are woven, knitted, embroidered or sewn into or onto the hydrophobic substrate to form channels that facilitate the diagnosis.

The microfluidic point of care fabric devices and mechanical stages may be further encased in a suitable enclosure to protect them from environmental factors, such as handling during transportation, sunlight, moisture, humidity, contaminants and so on. In such instances, the enclosure may be designed in such a way that it can be opened to allow access to the device. Alternatively, the enclosure may present such a way that there is an opening only for sample, reagent or fabric introduction so that the rest of the device is totally enclosed during operation. Enclosures suitable for the device and mechanical stages may have properties such as transparency, strength, water resistance, moldability, and the like. Some useful materials that can perform well as enclosures for the device and mechanical stages may include, but not limited to, glass, plastics, such as poly (methyl methacrylate), polystyrene, polyethylene, polypropylene and the like. The enclosure may contain such devices to sanitize the equipment housed within the enclosure after each analysis, such as, but not limited to chemicals, UV light or heating elements.

Referring to FIG. 1, a schematic diagram of the microfluidic point of care fabric diagnostic system 100, according to an exemplary embodiment of the present invention. The system 100 comprises a fabric substrate or contact fabric 102. In one embodiment, the fabric substrate 102 is made of one or more threads having one or more hydrophobic threads and one or more hydrophilic threads. The threads are attached to the substrate by weaving, knitting, embroidering, or sewing. In one embodiment, the threads could have suitable modifications to enable efficacy as a diagnostic composition. In an exemplary embodiment, at least one thread comprises a suitable antibody for specific antigen to detect the presence or absence of an analyte in the test sample. Such antibodies are linked to the thread and may include chemical and physical modifications.

In one embodiment, the fabric substrate 102 is made from fibers of diameter 5 to 100 micron, thread of diameter 50-600 micron and, constructed to obtain fabric void fractions between 30% to 95%. In one embodiment, the fabric devices are about 2 ft by 2 ft in size and the enclosure is about 4 ft by 4 ft. The fabric devices are composed of fibers with surface treatments to meter and disperse fluid flow or separate analytes. In one embodiment, the fabric devices could be impregnated with chemical reagents. In one embodiment, the device enclosure comprises an electronic visual display to select analysis type and report analysis progress. The enclosure is configured to house a fabric stand 104, optional sample reservoir stand, 3-4 movable electrical arms with instrumentation embedded within them. In one embodiment, the enclosure has an opening to insert fabric, patient sample and if needed reagent tray, wherein the patient sample is collected first. Further, the electronic components are provided with moisture protection.

In one embodiment, the fabric substrate 102 consists of several different variations of weaving, knitting, embroidery or sewing of the hydrophilic threads into the hydrophobic substrate specifically to control the flow path and rate of flow to a sample introduction zone, a sample preparation zone, and/or a sample testing zone, to optimize the diagnosis or chemical reactions for blood, urea or saliva samples. The fabric may be held in place by a holder or fabric stand 104 to keep the fabric taunt and supply a means of attaching the sample and fluid cartridges to the fabric. The fluid cartridges or reservoirs that contain sample cartridge 106 having blood, urea, or saliva samples, and/or chemical reagents or reagents cartridge or reagent attachment 110 required to complete analysis of the blood, urea, or saliva samples are attached to the fabric substrate 102. In one embodiment, the fabric stand 104 is mounted over a reservoir stand 108. In one embodiment, the system 100 further comprises a mechanical stage 112 that contain electrical and/or analytical equipment or devices or instrumentation 114 to record, detect or facilitate chemical reactions and/or condition the air above the microfluidic point of care fabric device for analysis may be automated to move about the system through means of a wheel and track 116.

Figure 2:
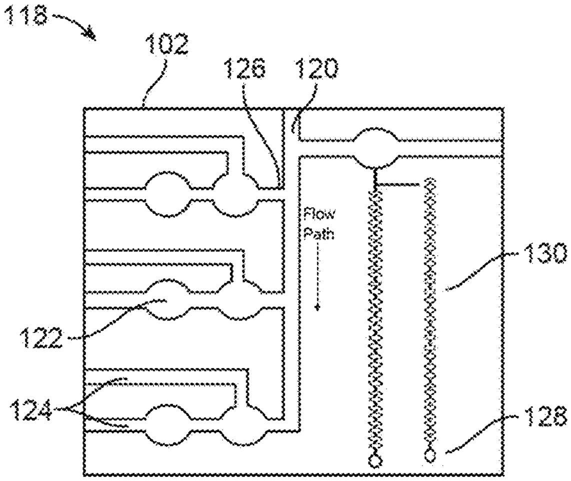
FIGS. 2-4 exemplarily illustrate schematic representations of threads which can be woven, knitted, embroidered or sewn together to form the microfluidic point of care fabric devices for, urine, blood, or saliva analysis, according to one embodiment of the present invention.
Figure 3:
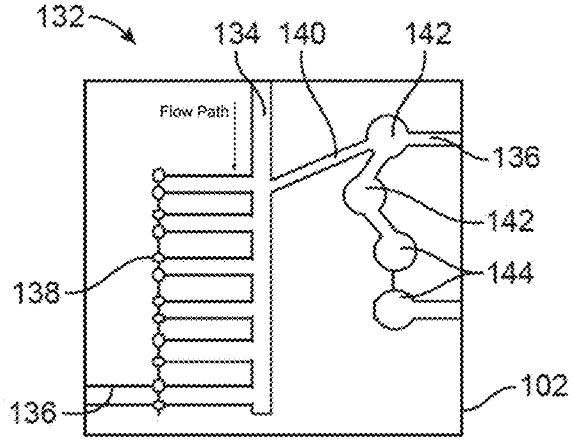
Figure 4:
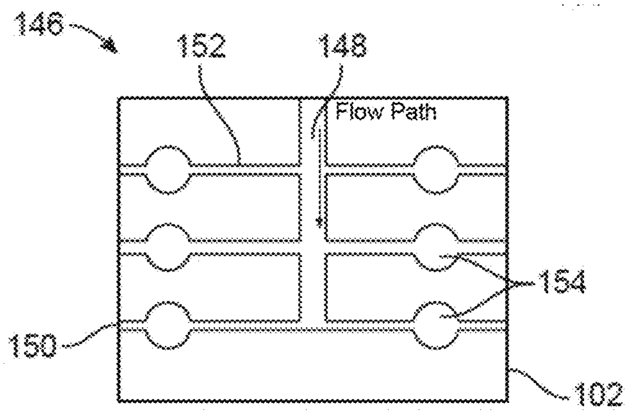

Referring to FIGS. 2-4, schematic representation of the microfluidic point of care fabric devices (118, 132, and 146) respectively, according to one embodiment of the present invention. FIG. 2 exemplarily illustrates a device 118 configured to use in sample analysis. In one embodiment, the bodily fluid sample is obtained from about 10 microliter to 10 milliliter in volume. In one embodiment, the analysis of bodily fluid is used for diagnosis of medical conditions. In one embodiment, the sample is saliva. The device 118 comprises a fabric 102 designed for saliva analysis. The fabric 102 is designed 118 for saliva analysis, particularly useful for virus or bacterial detection in which the hydrophilic threads are woven, knitted, embroidered or sewn onto the hydrophobic substrate to form channels in which fluid can flow from the sample cartridge to a PCR analysis zone to the right of the fabric, consisting of at least thirty testing zones connected in series by one small channel each, or to a immunoturbidity analysis zone to the left of the fabric 102. In the immunoturbidity analysis zone, there are hydrophilic threads represented by the grey lines with a main flow channel or a sample entry 120 connecting different channels, each with a proximal end, nearest to the main flow channel 120, and a distal path connecting the proximal end to the testing zone 122. The sample may flow to make contact with reagents either impregnated in the fabric substrate 102 in the testing zone 122 or originating from a reagent cartridge 110 connecting to the fabric substrate 102. If the reagent is originating from a cartridge then there may be an additional flow channels 124 after the testing zone extended from the testing zone 122 to the end of the fabric where the cartridge is attached. There may be electrical conducting and sensing components at each of the testing zones 122. The electrical material may be embedded in the fabric at the antigen test zones 122 or embedded into a mechanical stage in FIG. 5-7 and inserted into the fabric 102 once the mechanical stage is lowered over the fabric 102. In the PCR analysis zone, there are at least thirty PCR chambers 130 connected, in series, by one small channel each. After passing through the thirty chambers, the sample may flow to the last zone where an analyte can be detected by electrical means. There may be electrical conducting, sensing or analytical components in the testing zones of the PCR chambers 130 and/or in the last testing zone 128 either embedded in the fabric or embedded into a mechanical stage 112 in FIG. 5-7 and inserted into the fabric once the mechanical stage is lowered over the fabric.

FIG. 3 exemplarily illustrates a device 132 configured to use in sample analysis. In one embodiment, the sample is blood. The device 132 comprises a fabric 102 designed for blood analysis, specifically for cell counting and electrolyte analysis, comprises hydrophilic threads, which can be woven knitted, embroidered or sewn onto the hydrophobic substrate to form several channels connected to a main flow channel forming the design presented in the contact fabric 102 for electrolyte analysis as shown by the grey lines in the left zone of the fabric 102 and for cell count analysis as shown by the grey lines in on the right zone of the fabric 102. For the electrolyte analysis, the hydrophilic threads represented by the grey lines are woven, knitted, embroidered or sewn onto the hydrophobic substrate to form several channels connected to a main flow channel 134. Each different channel would consist of a proximal end nearest to the main flow channel, a distal path connecting the proximal end to the testing zone, and a testing zone 138 where the sample may flow to make contact with an ion sensing electrode either embedded into the fabric at the testing zone 138 or attached the mechanical stage 112 in FIG. 5-7. Sample may flow to make contact with reagents either impregnated in the fabric substrate in the testing zone 138 or originating from a reagent cartridge 110 connecting to the fabric substrate 102. If the reagent is originating from a reagent cartridge then there may be an additional flow channel 136 after the testing zone 138 extending from the testing zone to the end of the fabric 102, where the reagent cartridge 110 is attached. For the cell count analysis zone, the hydrophilic threads represented by the grey lines are woven, knitted, embroidered or sewn onto the hydrophobic substrate to form a main flow channel 134 in which fluid can flow from the sample cartridge at 134, to sample preparation zone 142 in which the sample components may be extracted and separated in order to facilitate detection of analyte, after coming into contact with reagent from reagent cartridges 110 or from chemicals impregnated or immobilized in the hydrophilic threads in the preparation zone 142. The prepared sample will then flow to the analysis zone consisting of two testing zones, the proximal zone and the terminal zone connected by one small channel at cell count test zone 144. In the proximal testing zone there may be electrical, conducting, sensing, and resistance components either embedded in the fabric at cell count test zone 144 or attached to a mechanical stage 112 in FIG. 5-7 and inserted into the device once the mechanical stage is lowered over the fabric.

FIG. 4 exemplarily illustrates a device 146 configured to use in sample analysis. In one embodiment, the sample is urine. The device 146 comprises, a fabric 102 designed for urine analysis. The fabric 102 is designed for urine analysis comprises hydrophilic threads or carrier fibers 152, which can be woven, knitted, embroidered or sew onto the hydrophobic substrate to form several channels connected to a main flow channel forming the design presented by the grey lines in carrier fibers 152. Each different channel consists of a proximal end, nearest to the main flow channel, a distal path connecting the proximal end to the testing zone 154, and a testing zone where the sample may flow to make contact with reagents either impregnated in the fabric substrate in the testing zone or originating from a reagent cartridge 110 connecting to the fabric substrate 102. If the reagent is originating from a fluid cartridge then there may be an additional flow channel 150 after the testing zone extended from the testing zone to the end of the fabric where the fluid cartridge is attached. As shown in FIGS. 2-4, several such channels may exist in the fabric to conduct different analysis, equally spaced apart as to prevent contamination of one analysis from the other. The progress of the analysis may then be recorded or detected by the electrical equipment embedded in the fabric at testing zones 154 or attached to the mechanical stage in FIG. 5-7. Sample enters at carrier fibers 152 flows to each testing zone 154 by means of flow paths 152, where diagnostics reactions can take place.

Figure 5:
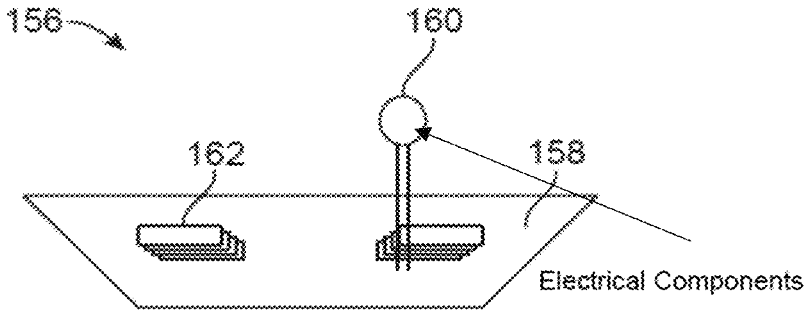
FIGS. 5-7 exemplarily illustrate schematic representations of mechanical stages that are engineered to join with the fluid cartridges to form the enclosure, according to one embodiment of the present invention.
Figure 6:
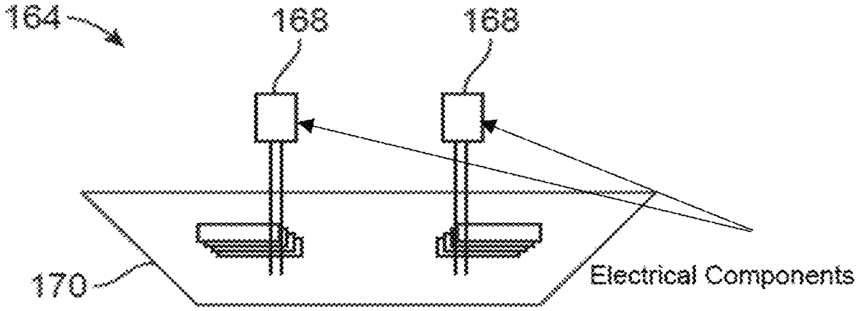
Figure 7:
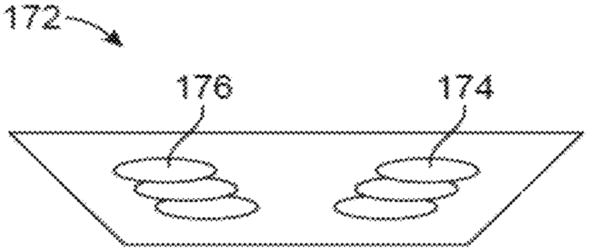

Referring to FIGS. 5-7, schematic representation of the microfluidic point of care mechanical stages or fabric contactors (156, 164, and 172) respectively, according to one embodiment of the present invention. FIG. 5 exemplarily illustrates a stage 156 for saliva analysis in one embodiment of the present invention. FIG. 6 exemplarily illustrates a stage 164 for blood analysis in one embodiment of the present invention. FIG. 7 exemplarily illustrates a stage 172 for urine analysis in one embodiment of the invention. In one embodiment, the fabric contactor is less than 2 ft by 2 ft in size and the enclosure is up to 4 ft by 4 ft.

The stage 156 is designed for saliva analysis comprises electrical or analytical equipment, such as, biosenor(s) 160 or photometer 162 to detect for certain infections and to record presence of antigen-antibody complexes. Each stage (156, 164, and 172) consists of machined or molded parts or housing (158, 170, and 176) respectively, configured to enclose or house the electrical and analytical equipment and/or provide enclosure during analysis. The stage 164 designed for blood analysis comprises electrical or analytical equipment 168, such as an ion probe(s) and electrical conductors, resistors and voltage probes. The stage 172 is designed for urine analysis comprises electrical or analytical equipment 174 to record color changes in the fabric device which could be a lens, sensor, colorimeter, photometer or other electrical or optical equipment.

Example

Figure 8:
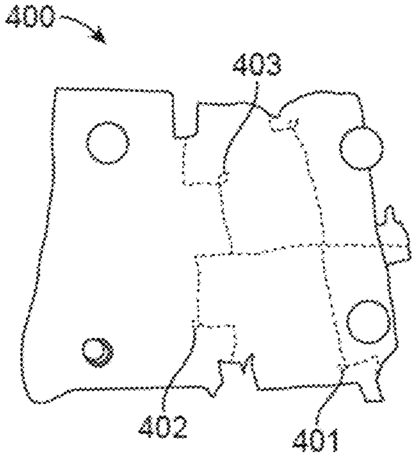
FIGS. 8-9 exemplarily illustrate an example demonstrating the effect of the placement of hydrophilic and hydrophobic yarns in an amphiphilic fabric, according to one embodiment of the present invention.

The dynamics of liquid flow in a porous medium is governed by the size, orientation, and surface chemistry of its flow channels. The rate of liquid flow into a fabric can thus be controlled predominantly by the placement and surface chemistry of the yarns. FIG. 8 exemplarily illustrates an experiment demonstrating the effect of the placement of hydrophilic and hydrophobic yarns in an amphiphilic fabric. The effects are examined to determine if yarn placement could be used to control the flow path into an embroidered fabric and if concentration of irons in aqueous media can accurately and simultaneously be detected via electrochemical means with in different test regions of a simply constructed embroidered fabric or microfluidic diagnostic fabric or hydrophobic polyester fabric substrate 400. To address these requirements, the hydrophobic polyester fabric substrate 400 consisting of polyester fibers woven in a plain weave pattern was chosen, in which two sets of yarns intersect each other at right angles and each yarn, alternating, crosses over and under intersecting yarns. The hydrophilic yarns are made from, but not limited to, cotton fibers. The cotton fibers were embroidered by hand onto the surface of the hydrophobic polyester fabric substrate 400 using the back-stich technique, in which an individual thread is sewn backward onto the fabric substrate in the general direction of sewing. The thread crosses over the fabric one stich length in the backward direction of sewing, then passes under the fabric two stich lengths in the forward direction of sewing, and is brought back over the fabric one stich length in the backward direction of sewing, such that the thread from the first stich is touching the thread from the second stitch.

In commercial applications of the microfluidic fabric structure, the device is used to determine the nature and the concentration of analyte present in a sample of bodily fluid. In such a commercial applications, the type and concentration of the analyte solution would be constant and quantified using various kinds of electrical instrumentation. The electrical instrumentation could be either contained within the mechanical stages or embedded within the fabric. It is expected for any commercially available electrical instrumentation, that the ability to obtain an accurate electrical reading has already been proven, thus the inability to obtain an accurate electrical reading in this example would be a consequence of the microfluidic fabric device construction. As long as the fabric construction allows for control of the fluid flow and does not hinder the electrical instruments ability to become electrically active in the presence of the analyte, the electrical readings obtained using the invention are meaningful. For initial experiments it was determined to be more critical to test the feasibility of detecting different analyte concentrations in the fabric rather than seeking to identify different analyte types by use of different electrical sensors. Therefore, the same multimeter probe was used for each reading and only the ability to detect different concentrations of ions within the fabric structure by electrochemical means was investigated.

The experiment method utilizes an AstroAI digital multimeter with one or more test leads. The test leads were kept at a constant distance apart during data collection. The hydrophobic substrate was a 100% polyester tablecloth, and hydrophilic threads were 100% white cotton embroidery thread from a standard embroidery starter kit. The purified water used for the fabric calibration reading and to prepare saltwater solutions was obtained from a single bottle of Aquafina® brand purified water.

Three solutions of table salt (NaCl) and purified water were prepared having the volume of 2.16 mmol/L NaCl, 3.6 mmol/L NaCl, and 7.9 mmol/L NaCl. The salt was chosen to have the concentration in the range of healthy to unhealthy potassium concentrations in human blood. The health potassium concentration in human blood could have the salt concentration in the range from 2 mmol/L to about 4 mmol/L. The unhealthy potassium concentration in the human blood in the range of more than 5 mmol/L or outside of the healthy range. Four to five drops of purified water were placed in each test region to determine a calibration reading. The electrical resistance of each test region was then measured. To obtain the reading for each salt solution, four to five drops of each salt solution were placed, simultaneously, in test regions of the fabric structure as shown in FIG. 8. The test regions include, but not limited to, test zone 1 402, test zone 2 404, and test zone 3 406. The electrical resistance of each test region (402, 404, and 406) was then measured.

Figure 9:
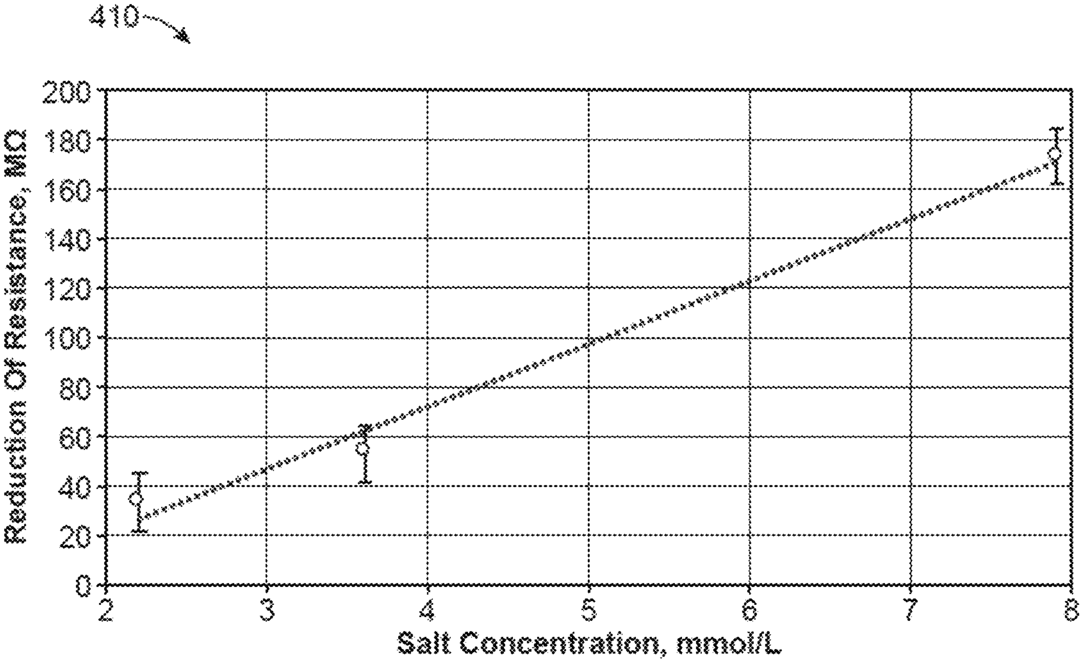

FIG. 9 exemplarily illustrates a graph 410 showing the reduction in resistance due to increasing levels of salt concentration. The reduction in resistance due to increasing levels of salt concentration was measured by subtracting the electrical resistance reading of the saltwater solution in the fabric from the electrical resistance reading of the purified water in the fabric. The resistance was measured using a multimeter and test leads. In between the measurements, the test leads were placed in a buffer solution of filtered water with resistance level similar to the salt solutions. The experiments were repeated for three times.

FIG. 9 displays the average reduction of resistance in the fabric measured at each test region versus the concentration of salt in the aqueous solution. The resistance readings from the salt experiments showed distinct differences of electrical resistance in each test region (402, 404, and 406) of the fabric 400. These readings were scaled with the concentration of NaCl dissolved in water that was wicked into that zone of the fabric 400. Thus, it is possible to accurately detect different concentrations of analyte within a simply constructed microfluidic fabric by electrochemical means.

The fabric construction also allowed for control of the fluid flow path into the fabric. If the fabric did not control the flow of liquid, similar resistance readings would have been obtained in each zone, however, unique resistance readings were detected within each test zone during the duration of experiments. Also, It was observed that aqueous fluid was only absorbed into the hydrophilic cotton yarns. No signal amplification, sophisticated equipment or electrical coating of fibers was required to obtain the readings. Thus, it is expected that manufacture of the microfluidic fabric diagnostic device can also be completed with relatively simple, low-cost equipment and assembly methods.

Figure 10:
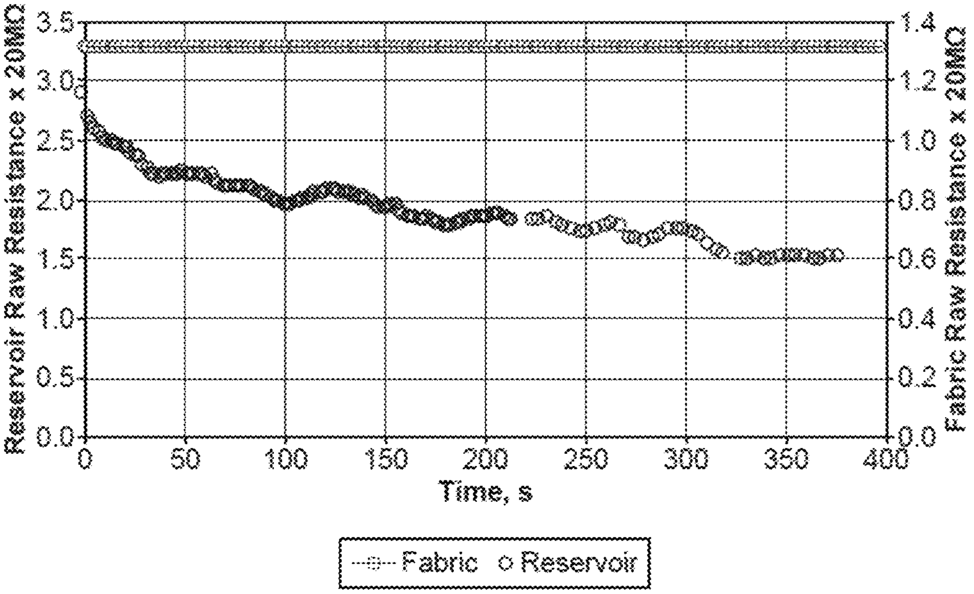
FIG. 10 exemplarily illustrates an example of the reading stability in the fabric as compared to a liquid reservoir, according to one embodiment of the present invention.

FIG. 10 shows a graph 500 demonstrating an example of the reading stability in the fabric as compared to a liquid reservoir. During the experiment, it was observed that resistance readings were obtained more quickly. In addition, the readings were more stable when measured in the fabric than when measured by more traditional means in a fluid reservoir. The reservoir reading takes over seven minutes to stabilize while the fabric reading is immediately stable.

In one embodiment, the fabric substrates used in the microfluidic point of care at home diagnostic system could be made by inter-weaving threads of polymer-based threads. Methods of interweaving are generally known among textile manufacturers. A useful method of interweaving includes the use of a single warp, single weft, plain weaving technique, in which the weft thread crosses the warp threads at ninety-degree angels by going over one, then under the next, and so on. Warp means the lengthwise threads, while the weft means the threads that threaded through the warp, or the horizontal threads. Other methods of introduction warp and weft are known to the art. The patterning and frequency of the warp and weft structure can influence the fluid flow properties such as rate and direction of fluid flow within the fabric, and hence provide greater control over the movement of the fluid in the fabric required for the invention. In addition, thread properties, such as, turns per inch, fiber shape, fiber length, fiber diameter, or surface chemistry can be used to control the rate of fluid flow into the fabric. Currently, machines exist that are used extensively in the textile manufacturing industry for the production of finished textile goods using the single warp, single weft, plain weaving technique along with other techniques.

The fabrics used in the microfluidic point of care at home diagnostic system invention can also be made by the method of knitting in which fabrics are constructed by interlocking a series of loops made from one or more threads, with each row of loops caught into the preceding row. Methods of knitting are generally known among textile manufacturers. A useful method of knitting includes a plain knit in which each loop is drawn through other loops to the right side of the fabric. The loops form lengthwise in columns, or wales, on the fabric face, giving it a sheen, and crosswise rows, or courses, on the back. Other methods of introduction wale and courses are known to the art. Knits may be advantageously used to the invention rather than weaves to affect the overall void structure and volume of fluid retained in the fabric for the analyses in the diagnostic device. Knits tend to have more porosity than woven fabrics, thus depending on the design can be used to increase the volume of fluid retained in the testing zones and flow channels of the fabric.

The hydrophilic flow channels within the fabric used in the microfluidic point of care at home diagnostic system can be made by either inter-weaving or knitting the hydrophilic threads of the polymer based fiber with hydrophobic threads, using weaving and knitting techniques as described herein, or by needlework such as embroidering or sewing the threads onto a fabric. Methods of sewing and embroidery are generally known among textile manufacturers. A useful method includes, a back stich, in which an individual thread is sewn backward in the general direction of sewing. The thread crosses over the fabric one stich length in the backward direction of sewing, then passes under the fabric two stich lengths in the direction of sewing, and is brought back over the fabric one stich length in the backward direction of sewing, such that the thread from the first stich is touching the thread from the second stitch. Other useful methods included but are not limited to, stem stich, back stich, chain stitch, blanket stitch or French knot.

A loom is an exemplary device used for weaving and may be advantageously used for the production of the diagnostic fabric devices of the invention. Several types of looms are readily commercially available for use. Exemplary looms useful in the invention include, but not limited to, jacquard loom, dobby loom, treadle loom, power loom and the like.

A knitting machine is an exemplary device used for knitting and may be advantageously used for the production of the diagnostic fabric devices of the invention. Several types of knitting machines are readily commercially available for use. Exemplary knitting machines useful in the invention include, but not limited to, circular, straight bar, flat bar, raschel, tricot and the like.

Embroidery and sewing machines are exemplary devices used for needlework and may be advantageously used for the production of the diagnostic fabric devices of the invention. Several types of embroidery and sewing machines are commercially available for use. Exemplary machines useful in the invention include but are not limited to, single, double, multihead, multihead high speed embroidery machine, and/or flat bed and cylindrical head sewing machine.

The interweaving, knitting, embroidery and/or sewing may also be affected using threads from different types of fibers. For example, a polyester fiber may be interwoven with a silk fiber. In another example, a polyester fiber may be interwoven with a silk and a polypropylene fiber or cotton fiber. Other useful fibers for the invention include but are not limited to nylon, viscose, carbon fiber, graphene.

The dynamics of liquid flow in a porous medium is governed by the size, orientation and surface chemistry of its flow channels. The rate of liquid flow into a fabric may thus be controlled predominantly by the placement and surface chemistry of the threads. The rate of liquid flow into a fabric can be affected by two geometries, the inter-thread capillary space between threads, and the intra-thread voids between fibers. For the invention described herein, a capillary space is defined as the void space between two parallel like threads or fibers. Because capillary flow relies on adhesive forces between a liquid and a solid surface, capillary action or wicking can be limited to cases when two threads or fibers of the same surface chemistry are placed side by side. Thus, the flow rate and direction of flow within fabrics can be controlled by the spacing, surface chemistry and placement of the threads within the fabric. Large diameter threads within the same width and for the same construction of thread, can yield smaller flow channels in a fabric, and smaller diameter threads within the same width and for the same construction of thread, can yield larger flow channels in the fabric. Similarly, for the same diameter of thread with the same construction technique, threads composed of more fibers can yield smaller intrachannel flow voids than threads composed of less fibers. The relative amounts of fibers and the spacing between threads used for preparing the final fabric devices depends on various factors such as strength, dynamics of sample fluid flow, pliability, test accuracy, manufacturing economics and the like and will become obvious to one skilled in the art. Control of fluid flow in microfluidic fabric devices made by interweaving fibers of various surface chemistries at various spacing are described in prior art (my ACS article). Fiber diameters suitable for this invention can range from 10 to 30 micron, and thread diameters useful for this invention can range from 200 to 400 micron, consisting of 100-400 fibers per thread, assembled to achieve fabric surface coverage from 70 to 95%.

The fabrics used in the microfluidic point of care at home diagnostic system invention may be mounted on a substrate. The substrate may be present to provide strength, and mechanical integrity to the fabric as well as keep it taunt during wetting. The substrate may be chosen from a number of materials known to those skilled in the art and may include but are not limited to, metal backing such as steel, iron, titanium, alloys and the like, plastics such as poly (methyl methacrylate), polystyrene, polyethylene, polypropylene, and the like, cardboard, wood, and other and combinations thereof.

The mechanical stages, fluid cartridges, or fabric holder used in the microfluidic point of care fabric device system can be manufactured by methods of casting, molding, machining, joining, shearing and forming. The parts can then be assembled by means of sub assembly, partial assembly or full assembly by outsourcing to service providers or after investing in assembly equipment to develop a custom assembly process. The appropriate assembly method and service provider will be known to one skilled in the art of manufacturing processing.

The present invention provides mechanical stages as an alternative method for introducing electrical and analytical components required for diagnostics in the microfluidic fabric, to be used solely or in combination with coating the fibers or embedding the fabric with these components. This alternative provides great advantage to the flexibility of manufacturing the device to ensure the cost and complexity required to engineer the microfluidic fabric device system is suitable for and can quickly be reconfigured for the applications of its use. Standard assembly methods can be used and standard electrical components can be interchanged to quickly customize the mechanical stages of the system for specific tests. For example, when a new biosensor is needed to detect a new virus or bacteria, instead of having to reengineer a fiber or fabric to contain a new sensing component, by coating or grafting, reweaving and then repeating clinical testing verifications and validations, instead the sensor in the mechanical stage can simply be swapped with a new sensor and reverified. In this way, this system can be rapidly tailored to the immediate needs of the public without research or new customization to the fabric or fiber production processes. Electronics and analytical device manufacturing and assembly are arts that have been developed to a very high degree of skill in many parts of the world. The mechanical stages also help to improve accuracy and reliability of analysis by providing a means to seal-off the environment nearest to the fabric devices, within 3-10 mm, and introduce conditioning agents, such as inert gases, or remove gases with a vacuum pump during analysis. Such advantages should enable simple, low cost manufacturing of this system to suite a number of different routine diagnostic applications. A low-cost diagnostic device that can conduct a number of tests to monitor overall health is ideal for frequent use at home to monitor the health of people with and without preexisting conditions.

The present invention provides weaving, knitting, embroidery, or sewing as alternative methods to manufacturing of Polydimethylsiloxane (PDMS)-based microfluidic devices, which may also have been referred to as "Lab on a chip" devices. Such PDMS devices are typically reusable. Weaving, knitting, embroidery, or sewing are arts that have been developed to a very high degree of skill in many parts of the world. Intricate patterns whose dimensions are limited only to the thickness of an individual thread may be woven in a highly parallelized and automated manner. This technique is capable of being adapted for the manufacture of the devices of the invention in an easy manner. By engineering fabrics with threads of various surface chemistries it is possible to manufacture a very large number of devices, which are capable of multiple analysis using a single commercial textile manufacturing method. This provides a great advantage over the existing techniques which uses photolithography and complicated multi step clean room techniques which are not suitable for commercial scale manufacturing. During manufacturing, a large strip of the device of the invention may be made and subsequently smaller strips may be cut which are then used for further processing, such as gluing, nailing or stapling onto a substrate. The nature of the fabric manufacturing process and device qualities allow for the possibility of patterning complex fluid geometries using standard weaving or knitting techniques, and use of embroidery, or sewing provide optionality in these designs when more precise control of fluid or more intricate flow patterns are desired. Further, an input sample may be split into multiple branches using a combination of hydrophilic and hydrophobic yarns.

The present invention provides cartridges as an alternative method to impregnating fabrics with fluids. Such cartridges would be filled with reagent required for each analysis. Cartridge manufacturing and automated filling are arts known to the food, medical and electronics industries. Known methods can be adapted to fill precise amounts of fluids into cartridges which can dispense the fluids when certain pressures or temperatures are applied, or when barriers are removed or pieced once cartridges are inserted into certain positions. By engineering cartridges to dispense fluid at a precise time, to a precise location, within the microfluidic fabric, reagent impregnation into the fabric is not needed. This can further simplify the manufacturing and conditioning of the fabric components required for complex analysis. Further the cartridges may be shaped to specifically join with a mechanical stage to form an airtight enclosure over the fabric during analysis. This can serve to protect the electrical components of the device from moisture from reagents or sample, it can also provide a means of conditioning the air above the fabric during analysis as mentioned herein.

In one embodiment, the device may be used for diagnosis in a variety of applications. For example, in the case of using the device for the invention to monitor overall health using routine metabolic panel analysis, wherein direct detection of the analyte, or electrolytes, can be effected by appropriate use specific ion selective electrodes that undergoe a specific reaction with the corresponding ions contained in the analyte. In this case, the sample which may contain the analyte would wick from the sample cartridge into the fabric and follow the flow path of the hydrophilic yarns to enter the testing region. Each testing region would contain a different ion selection electrode. The electrodes can be attached to the thread in the testing zone, via coating or polymer grafting, or inserted into the fabric by means of assembly within the mechanical stages. Once the sample has reached the testing zone and fully wetted the region, electrical resistance data can be collected for a period of time. The analyte, if present, will impact the conductivity output of the ion selective electrode in the test zone and can be read out using the appropriate electrical measurement means. If the sample does not comprise the analyte, then there will be no change in the conductivity of the electrode. The sample will continue to flow to each test zone and conduct this analysis in the same way for different analyte-electrode pairs present in the fabric. The sample solution stops flow when there are no more flow regions or test zones remaining in the device. The analysis may be conducted multiple times on different patient samples throughout the year. Changes observed to the results of this analysis for the same person over time can provide warnings of conditions which include but are not limited to, congestive heart failure, kidney failure, liver failure, malnutrition and/or dehydration.

In another exemplary situation, the device could be used for immunoturbidity analysis and PCR analysis to test for infection or the presence of antibodies after fighting off an infection. The sample for detection of the antigen, virus or bacteria enters from the sample cartridges and wicks in the fabric following the flow path created by the hydrophilic threads. For the PCR region of the fabric the sample enters a buffering zone of the fabric, where it may come into contact with reagents designed to separate, extract, express or lyce the analyte in the sample. Necessary reagents wick from the reagent cartridges into the buffering zone following the hydrophilic threads making a flow path from the reagent cartridges to the buffer zone. Only a precise amount of buffering reagent will be contained within the reagent cartridge as is required for the appropriate reaction to take place for the analysis. The buffered sample then enters the PCR region of the fabric. The sample reagent will move through each PCR chamber in time increments. The size of each PCR chamber and the distance between PCR chambers dictates the duration of time the sample spends in each zone. In the first chamber, a heating element will be activated in the fabric to heat the sample to 94° C. for three minutes, the next thirty chambers a heating element will be activated in the fabric to heat the sample to 94° C. for thirty seconds, 55° C. for 65 seconds and 72° C. for another thirty seconds, the final chamber will heat the sample to 72° C. for another four minutes to complete the denature of the DNA contained within the sample and replicate it for proper reading at the end of the PCR reaction chamber. These heating elements may be contained within the mechanical stage and inserted into the fabric once lowered over the fabric or embedded with the fabric threads, by coating or grafting. Once thermocycling in the PCR chambers is complete the analyte in the sample can be read using a biosensor specific to the virus or bacteria requiring detection. This biosensor may be attached to the fabric at the end of the PCR chamber or may be contained within the mechanical stage and inserted into the fabric at the end of the PCR chamber once the mechanical stage is placed into position over the fabric. The analyte, if present, will impact the conductivity output of the biosensor and can be read out using the appropriate electrical measurement means. For the immunoturbidity analysis region of the fabric, the sample flows along the predefined path from the sample cartridges to the testing zone. In the testing zone it comes into contact with a secondary regent (detection antibody), then a primary regent (capture antibody). The analyte, if present, forms a complex with the secondary reagent first. The flow of solution comprising the complex reaches the primary reagent forming a second complex comprising the analyte, primary reagent and secondary reagent. The complex induces a change in conductivity of the conducting material, which is then read out using the appropriate electrical measurements. In some instances, a material may be added to the electrical components improve the electrical output from the device. If the sample does not comprise the analyte then the first and second complex do not form, thus no change in the conductivity of the conducting material. Conducting material may be attached to the fabric at the testing zone or may be contained within the mechanical stage and inserted into the fabric at the testing zone once the mechanical stage is placed into position over the fabric. The sample will flow to each analysis region completing this analysis for different analyte antibody complex detection. The sample will stop flow once there are no more regions to fill. The PCR and immunoturbidity analysis may be conducted multiple times on different patient samples with new fabrics of the same flow path design. Changes observed to the results of this analysis for the same person over time can provide confirmation of the presence or lack of an infection, or immunity or lack of immunity to an infection over time.

Biosenor and electrical detection instruments contained within the mechanical stages may be washed and resused between analysis by inserting a calibration or wash fabric and reagents into the system post analysis. Calibration fabric will be comprised of the same design as the test or analysis fabric, however wash reagents such as deionized water or washing solutions will be contained within the reagent cartridges used with the fabric.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A microfluidic point of care at home diagnostic system, comprising a fabric substrate having at least one edge and having a space positioned above it, and having one or more threads having hydrophobic nature and one or more threads having hydrophilic nature, wherein the threads are woven together, Wherein the fabric is configured to define a flow path for a sample to flow from an introduction zone to a preparation zone to a testing zone, in a pattern sufficient to optimize a sample analysis required for sample diagnostic analysis, one or more mechanical stages having analytical equipment configured to record and detect analytes or facilitate chemical processes and condition the air above the fabric to ensure its sufficiency for analysis, and one or more fluid cartridge reservoir cartridges attached to the edge of the fabric to supply the fabric with reagents required for analysis and shaped to connect with mechanical stages, such that the fluid reservoir cartridges and the mechanical stages together form an enclosure immediately above the fabric, wherein the mechanical stages are movable and lock in place with fluid cartridges.

2. The system of claim 1, wherein the at least one hydrophobic thread is made of fibers selected from a group consisting of polyester, polypropylene, cotton, silk, nylon, viscose or a combination of polyester, polypropylene, cotton, silk, nylon and viscose.

3. The system of claim 1, wherein the fabric is constructed to carry out various clinical tests and techniques including, but not limited to, polymerase chain reaction, basic metabolic panel and/or electrolytic analysis, cell counting, urinalysis, blood analysis, salivary analysis, extraction, separation, or immunoturbidimetry.

4. The system of claim 1, wherein the fabric is embedded or the fibers coated with electrical components.

5. A microfluidic point of care at home diagnostic system, comprising a fabric substrate having at least one edge and having a space positioned above it, and having one or more threads having hydrophobic nature and one or more threads having hydrophilic nature, wherein the threads are woven together, wherein the fabric is configured to define a flow path for a sample to flow from an introduction zone to a preparation zone to a testing zone, in a pattern sufficient to optimize a sample analysis required for sample diagnostic analysis, with one or more mechanical stages having analytical equipment comprising instrumentation configured to record and detect analytes or facilitate chemical processes and condition the air above the fabric to ensure its sufficiency for analysis, and at least one fluid reservoir cartridge attached to the edge of the fabric to supply the fabric with reagents required for analysis, shaped to connect with the mechanical stages, such that the fluid reservoir cartridges and the mechanical stages together form an enclosure immediately above the fabric, wherein the fabric and embedded instrumentation are contained within the enclosure that protects the analytical equipment and facilitates the interaction of the instrumentation with the fabric for one or more movable mechanical stages with embedded instrumentation.

6. The system of claim 5, wherein the at least one hydrophobic thread is made of fibers selected from a group consisting of polyester, polypropylene, cotton, silk, nylon, viscose or a combination of polyester, polypropylene, cotton, silk, nylon and viscose.

7. The system of claim 5, wherein the fabric is constructed to carry out various clinical tests and techniques including, but not limited to, polymerase chain reaction, basic metabolic panel and/or electrolytic analysis, cell counting, urinalysis, blood analysis, salivary analysis, extraction, separation, or immunoturbidimetry.

8. The system of claim 5, wherein the fabric is embedded or the fibers coated with electrical components.

* * * * *